(12) United States Patent
Collins et al.

(10) Patent No.: US 6,378,072 B1
(45) Date of Patent: Apr. 23, 2002

(54) CRYPTOGRAPHIC SYSTEM

(75) Inventors: Thomas Collins, Saratoga; John Gregory, Livermore; Ralph Bestock, Los Altos, all of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/017,759

(22) Filed: Feb. 3, 1998

(51) Int. Cl.[7] .................................................. H04L 9/00

(52) U.S. Cl. ....................... 713/187; 713/161; 713/193

(58) Field of Search ................................. 713/161, 168, 713/170, 176, 193, 200, 2; 380/29.3

(56) References Cited

U.S. PATENT DOCUMENTS

| | | | |
|---|---|---|---|
| 4,168,396 A | | 9/1979 | Best |
| 4,278,837 A | | 7/1981 | Best |
| 4,319,079 A | | 3/1982 | Best |
| 4,405,829 A | | 9/1983 | Rivest et al. |
| 4,433,207 A | | 2/1984 | Best |
| 4,465,901 A | | 8/1984 | Best |
| 4,799,635 A | * | 1/1989 | Nakagawa .................... 711/115 |
| 4,928,234 A | * | 5/1990 | Kitamura et al. ............ 711/151 |
| 5,343,527 A | | 8/1994 | Moore ............................ 380/4 |
| 5,421,006 A | | 5/1995 | Jablon et al. ................ 395/575 |
| 5,625,690 A | * | 4/1997 | Michel et al. ................. 705/53 |
| 5,717,379 A | | 2/1998 | Peters .......................... 340/539 |
| 5,835,594 A | | 11/1998 | Albrecht et al. ............... 380/23 |
| 5,844,986 A | | 12/1998 | Davis ............................. 380/4 |
| 5,884,986 A | * | 12/1998 | Davis ............................. 380/4 |
| 6,092,147 A | * | 7/2000 | Levy et al. ...................... 711/6 |

FOREIGN PATENT DOCUMENTS

| | | | |
|---|---|---|---|
| EP | 0 964 568 A2 | 12/1999 | .......... H04M/11/04 |

OTHER PUBLICATIONS

Bruce Schneier, Applied Cryptography, pages 38, 193–194.*
Rivest et al., "A Method for Obtaining Digitial Signatures and Public–Key Cryptosystems", 1978, Communications of the ACM, vol. 21, No. 2.
"PKCS #1: RSA Encryption Standard", Nov. 1, 1993, RSA Laboratories Technical Note, Version 1.5.
Schmidt, M., *C T Magazin Fuer Computer Technik*, 8:226–230, 232–35, Apr. 14, 1998, "Unter Ausschuss der Oeffentlichkeit Virtual Private Networks—Vertraulicher Datenaustausch Ueber das Internet.".
"Unter Ausschuss der Oeffentlichkeit Virtual Private Networks—Vertraulicher Datenaustausch Ueber das Internet." .
Wunnava, S. V., et al., Proceedings of IEEE Southeaston '96: Bringing Together Education, Science and Technology, pp. 107–110, 1996, "Advances in Virtual Design & Virtual Center Concept.".
"Advances in Virtual Design & Virtual Center Concepts.".
de Albuquerque, M. P., et al., *Nuclear Instruments& Methods in Physics Research, Section A: Accelerators, Spectrometers, Detectors and Associated Equipment*, 412(1):140–145, 1998, "Remote Monitoring Over the Internet.".
Gabel, J., *Elektrotechnische Zeitschrift E.T.Z.*, 105(20):1088–1091, 1984, "Ubermittlung von Fernwirkinformationen mit Temex.".

* cited by examiner

*Primary Examiner*—Gail Hayes
*Assistant Examiner*—Ho S. Song
(74) *Attorney, Agent, or Firm*—Leah Sherry, Oppenheimer, Wolff & Donnelly

(57) ABSTRACT

A cryptographic system and method for encrypting and decrypting data using public key cryptography. The encryption and decryption may be divided into tasks that may operate in parallel. A secure method of initializing the cryptographic system to allow for secure operations and protect against tampering with application software. The application program is retrieved from an encrypted file in external memory and authenticated before being executed.

6 Claims, 5 Drawing Sheets

CRYPTOGRAPHIC SYSTEM

BACKGROUND OF THE INVENTION

This invention relates generally to communicating data securely, and more particularly to a cryptographic system and methods of using public key cryptography.

Computer systems are found today in virtually every walk of life for storing, maintaining, and transferring various types of data. The integrity of large portions of this data, especially that portion relating to financial transactions, is vital to the health and survival of many commercial enterprises. Individual consumers also have an increasing stake in data security as open and unsecure data communications channels for sales transactions, such as credit card transactions over the Internet, gain popularity.

Protecting data stored in computer memory, tape, and disk is often important. However, just as important, if not more so, is the ability to transfer financial transactions or other communications from a sender to an intended receiver without intermediate parties being able to interpret the transferred message. Furthermore, as important transactions are increasingly handled electronically, authentication of the originator of a message must be ensured. For example, for electronic banking, there needs to be a way to authenticate that an electronic document, such as a bank draft, has actually been "signed" by the indicated signatory.

Cryptography, especially public key cryptography, has proven to be an effective and convenient technique of enhancing data privacy and authentication. Data to be secured, called plaintext, is transformed into encrypted data, or ciphertext by a predetermined encryption process of one type or another. The reverse process, transforming ciphertext into plaintext, is termed decryption. In public key cryptography, the processes of encryption and decryption are controlled by a pair of related cryptographic keys. A "public" key is used for the encryption process, and a "private" key is used to decrypt ciphertext. Alternatively, the private key may be used to encrypt the data, and the public key to decrypt it. This latter method provides a method of digitally signing data to positively identify the source of the data.

The prior art includes a number of public key schemes. However, over the past decade, one system of public key cryptography has gained popularity. Known generally as the "RSA" scheme, it is now thought by many to be a worldwide defacto standard for public key cryptography. The RSA scheme is described in U.S. Pat. No. 4,405,829.

The RSA scheme capitalizes on the relative ease of creating a composite number from the product of two prime numbers whereas the attempt to factor the composite number into its constituent primes is difficult. Pairs of public/private keys can then be found based on the factors of the composite number. A message is encrypted using a series of mathematical exponentiations and divisions based on one of the keys. If the matching key of the public/private key pair is known, the message can be decrypted using a series of mathematical exponentiations and divisions using the matching key. The composite number is a part of the public and private keys so it is known to the public. However, since the private key can only be found by factoring the composite number, calculating the private key from the public key is computationally difficult.

The security of the RSA technique can be enhanced by increasing the difficulty of factoring the composite number through judicious choices of the prime numbers. (This, of course would be true for any encryption/decryption scheme using or requiring prime numbers.) Another, and principle enhancement, is to increase the length (i.e., size) of the composite number. Today, it is common to find RSA schemes being proposed in which the composite number is on the order of 600 digits long. The task of exponentiating a number this long, however, can be daunting and time consuming, although not as difficult as factoring. Therefore, increasing the length of the composite number increases the security, but only at the expense of increased time to perform the encryption and decryption.

However, recently discovered techniques have greatly improved the efficiency with which encryption/decryption functions are performed using the RSA scheme. Rather than using two prime numbers to form the composite number conventionally employed in RSA cryptographic operations, it has been found that more than two prime numbers can also be used. In addition, it has also been found that the Chinese Remainder Theorem can be used to break an RSA encryption or decryption task into smaller parts that can be performed much faster than before.

In addition to the security of the data, another important issue with regard to cryptographic systems is the security of the system itself. In a system implementing an encryption algorithm, ensuring that the system is secure from tampering is important. One area of concern is the secure loading and storing of application programs for the system. If the application program can be altered or substituted, the security of a system may be breeched.

It is therefore desirable to provide an efficient cryptographic system for implementing public key cryptography with multiple prime factors. It is also desirable to provide a cryptographic system that may be initialized to a secure state while providing maximum flexibility for the user in providing application programs to the system.

SUMMARY OF THE INVENTION

A cryptographic system is provided having a processor and a plurality of exponentiation units. The processor receives encryption or decryption requests from a host processor and divides them into one or more exponentiation tasks. These exponentiation tasks are transferred to one or more execution units that perform the exponentiation and return a value to the processor. This allows the exponentiations tasks to be performed in parallel, thereby decreasing the time needed to perform the encryption and decryption requests.

The present invention further provides a method of initializing the cryptographic system in a secure manner. An external memory holds a first program file along with header information, a hash value, and a digital signature in an encrypted program packet. The first program file contains a key/option table holding an RSA cryptographic public key. A processor loads the encrypted program packet and decrypts it using a cryptographic key, however the resulting program file is only executed by the processor after authenticating it. If it cannot be authenticated, then the cryptographic keys are zeroed out, and the cryptographic system is put into a non-functioning state.

The first program file is authenticated by checking the header for proper format, computing an expected hash value of the first program file and comparing it with the hash value, and checking the digital signature with an RSA public key that is stored in the cryptographic system.

After authenticating this first program file, the processor executes the first program file. The first program file loads a second program file from the external memory. This second program file is generally a user-application program. It is authenticated in a similar manner to the first program file, but the digital signature is checked against the RSA public key found in the key/option table.

By this initialization process, the user of the cryptographic system may load personalized application programs with secret cryptographic keys not known to anyone else. The process ensures that the application programs cannot be altered or substituted with fraudulent programs. At the same time, the manufacturer of the cryptographic system can securely provide maintenance and upgrade programs over public networks, and ensure that only properly licensed users are using the programs.

A further understanding of the nature and advantages of the inventions presented herein may be realized by reference to the remaining portions of the specification and the attached claims.

DESCRIPTION OF THE SPECIFIC EMBODIMENT

Figure 1:
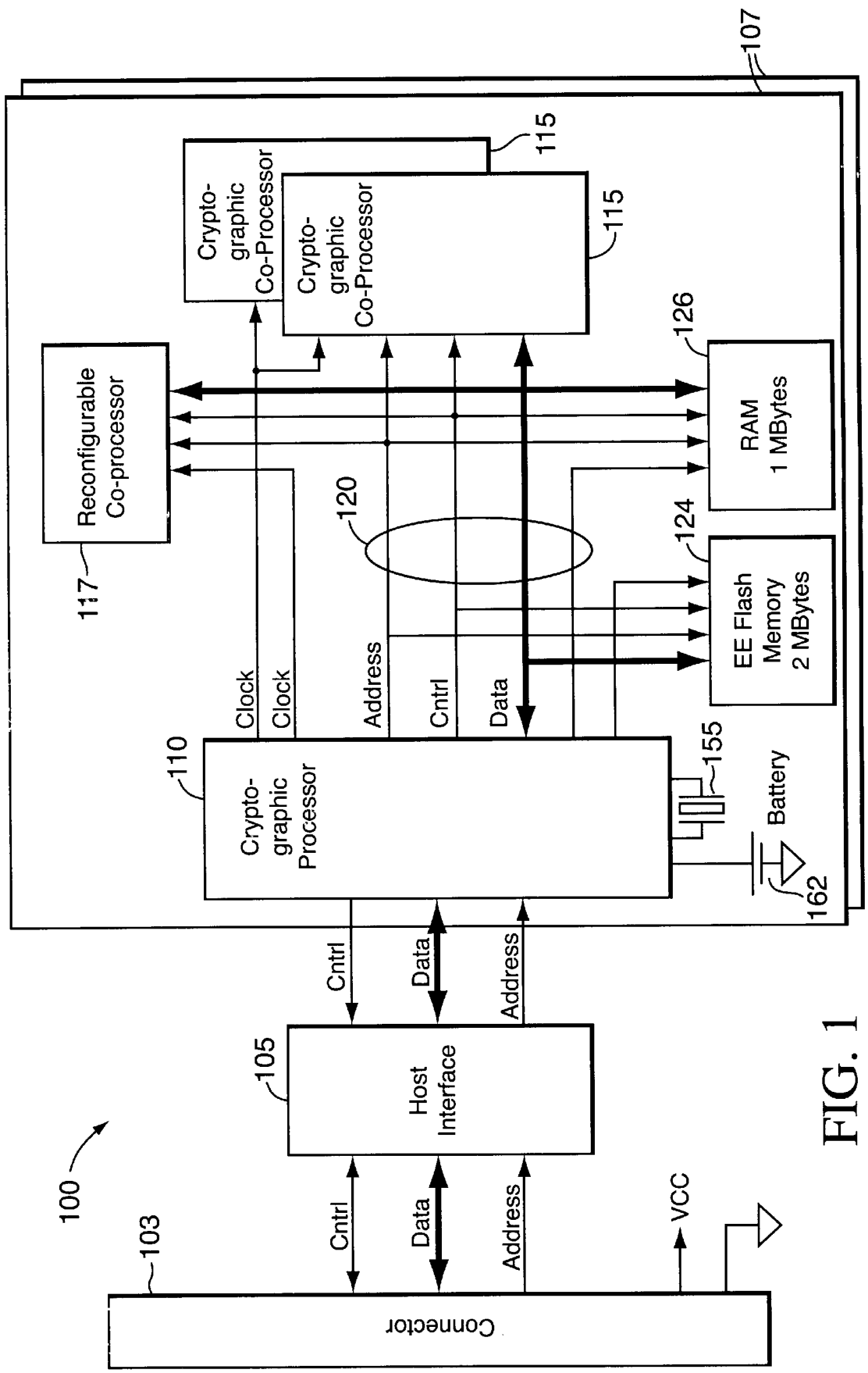
FIG. 1 shows, in block diagram form, a cryptographic system.

Turning now to the figures, and for the moment, FIG. 1, there is illustrated a cryptographic system 100 constructed according to the teachings of the present invention to implement RSA public key cryptography—although, as will be evident to those skilled in this art, other cryptographic schemes may be used. In operation, data is brought into cryptographic system 100 from an external source (not shown) such as a host computer, a network, or other source. The external source is connected to cryptographic system 100 through a connector 103. Cryptographic system 100 operates to receive data and instruction from the external source or host, to encrypt or decrypt the data, and return it to the host.

Preferably, the communicating medium connecting the host (not shown) and the cryptographic system 100 is a peripheral component interconnect (PCI) bus because, among other things, of its processor independence. However, it will be evident to those skilled in this art that other bus structures may be used, and even preferred given different host environments.

The connector 103 is coupled to a pair of processing boards 107 by a host interface 105. The processing boards 107 are each substantially identical in design and construction, so that a description of one will apply equally to the other. Each processing board 107 is separately addressable and may operate in parallel with the other.

As FIG. 1 shows, the processing boards 107 include a cryptographic processor 110 that operates, in response to the instructions from the host (not shown), to perform encryption or decryption. To accelerate the exponentiation tasks requested of the cryptographic processor 110, one or more cryptographic co-processors 115 and a reconfigurable co-processor 117 are provided. The cryptographic co-processors 115 are specially constructed to perform, quickly, the various exponentiations necessary to most cryptographic tasks. The cryptographic co-processors 115 are described in greater detail below in connection with FIG. 3.

Data is transferred between cryptographic processor 110 and cryptographic coprocessor(s) 115, and reconfigurable coprocessor 117 by a secure bus 120. Secure bus 120 carries address, control and data lines—as well as any chip select lines that may be used. To preserve the security of the cryptographic system 100, all information of a secure nature is encrypted before being placed on secure bus 120. In the specific embodiment, a DES engine, capable of DES encryption and decryption, is included in cryptographic processor 110, cryptographic coprocessor(s) 115, and reconfigurable coprocessor 117 for providing the encryption and description for secure bus 120. Of course, other types of security, other than DES may be provided, depending upon how much security is required and the resources available to provide the security.

Although the cryptographic processor 110, as will be seen, is constructed to include memory, additional memory, external to the cryptographic processor 110, is provided in the form of a flash memory 124 and a random access memory (RAM) 126. Data is transferrable to flash memory 124 and a random access memory (RAM) 126 by way of secure bus 120. In the specific embodiment, flash memory 124 has two megabytes of storage capacity. Its primary use in the specific embodiment is as a repository for a user-application program. A user-application program is encrypted and stored in flash memory 124 along with information to protect it from unknown alteration. After the system is successfully booted and the user-application program loaded into cryptographic processor 110, tests are done to ensure its authenticity before control of the system is transferred to the user-application program. Details of an exemplary method of securely booting the system and loading an application program are presented below with respect to FIGS. 4 and 6.

The RAM 126 is used for the storage of both secure and unsecure data. In the specific embodiment, it is one megabyte of volatile memory.

Cryptographic processor 110 is provided with the output of crystal oscillator 155 from which it generates clock signals for its own use and for use by other components of cryptographic system 100. A battery 162 is also optionally provided to supply backup power during a power failure. Its use is not required by the present invention.

Figure 2:
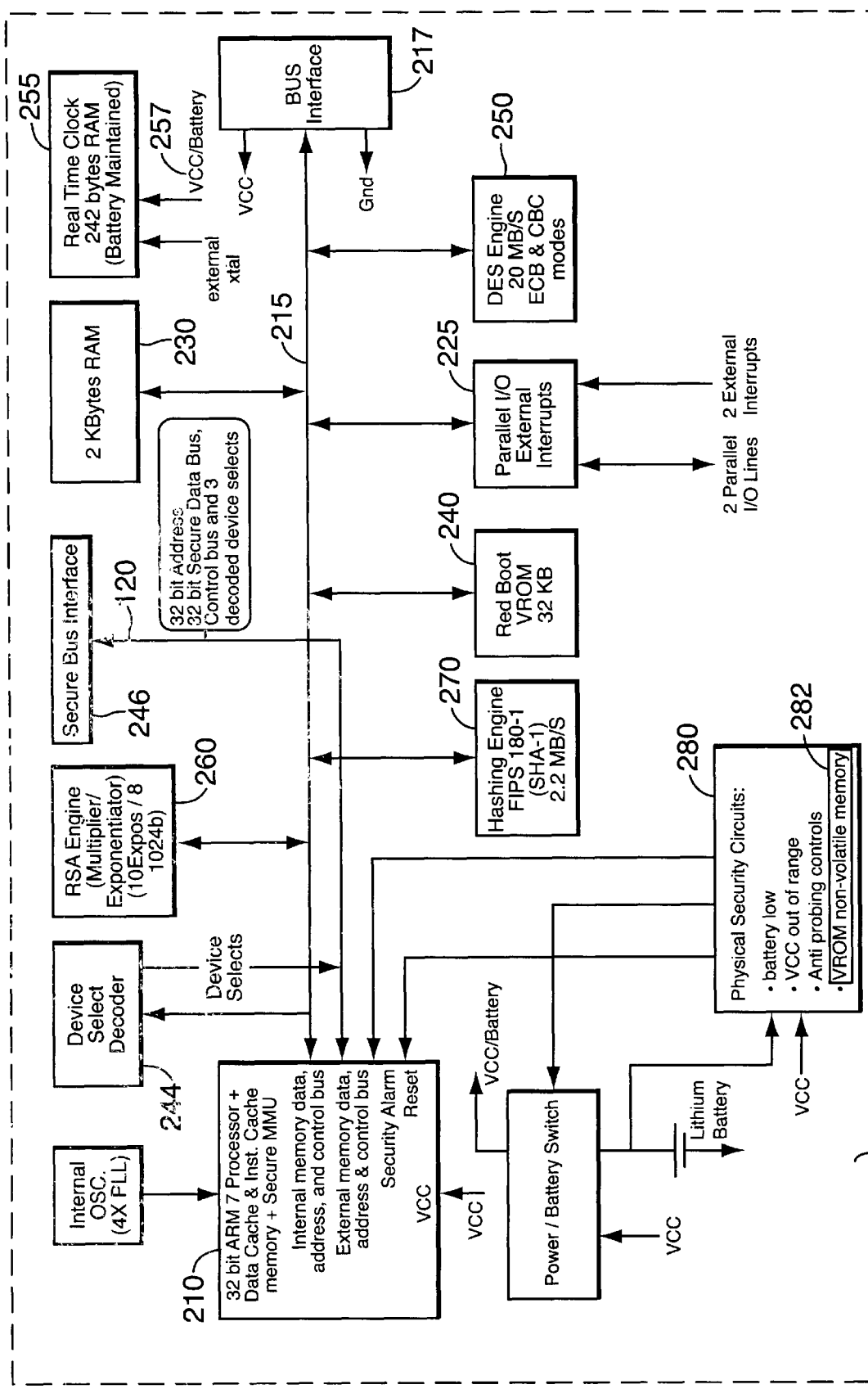
FIG. 2 illustrates the cryptographic processor forming a part of the cryptographic system of FIG. 1.

FIG. 2 depicts a more detailed description of cryptographic processor 110. Preferably, cryptographic processor 110 is physically secure from inspection and tampering by outside sources. In the specific embodiment, it meets the Federal Information Protection System (FIPS) level 3 standard. A currently available cryptographic processor 110 is the VMS310—NetArmor™ Encryption Processor available from VLSI Technology, Inc., in San Jose, Calif.

As FIG. 2 shows, the cryptographic processor 110 includes a central processor unit (CPU) 210 as the main controller of the system. CPU 210 executes initialization sequences and user-application programs. It receives data and instructions from the external host and breaks the instructions down into tasks as required or necessitated by the user-application program. It assigns some of the tasks to other specialized units (e.g., the one or more cryptographic co-processors 115) as will be described below. In the specific embodiment, CPU 210 is a 32-bit Advanced RISC Machine (ARM) 7 processor. This is a RISC-based processor constructed for pipeline operation. However, many different processors will be appropriate for use in a similar system.

CPU 210 is coupled with other elements within cryptographic processor 110 by means of a data/address bus 215. Data/address bus 215 is also coupled to host interface 105 through a bus interface 217. Bus interface 217 provides a path to host interface 105, while keeping data/address bus 215 secure from unwanted monitoring. Encryption and decryption requests are delivered to CPU 210 over data/address bus 215 through bus interface 217, and the results are returned by the same path. In the specific embodiment, data/address bus 215 is a 32-bit data bus with control and address signals. Data on data/address bus 215 is not necessarily encrypted, but is kept secure from tampering with physical security that is built into the chip that prevents probing of the chip.

During its operation, CPU 210 may have its operation interrupted by certain events. An interrupt circuit 225 is provided for sensing an interrupt event and communicating the event to CPU 210. This is a common practice and a design for interrupt circuit 225 will be readily apparent to one of skill in the art.

As FIG. 2. shows, the cryptographic processor 110 incorporates various support devices, including random access memory and read-only (RAM 230 and ROM 240), an encryption/decryption engine (DES engine 250) for encrypting and decrypting information communicated on the secure bus 120, an exponentiator circuit 260, and hashing engine 270. These components are all communicated to CPU 210 by data/address bus 215.

The random access memory (RAM) 230 is provided as memory for use by CPU 210. In the specific embodiment, it is a two-kilobyte RAM with a 32-bit data input. It may be used for storing the user-application program upon which CPU 210 operates, and as a scratchpad memory for temporary storage of data and variables. It is coupled to CPU 210 by data bus 215.

ROM 240 is what is known as a volatile ROM or VROM; it is a read-only memory that is physically secure from tampering or probing. A purpose of ROM 240 is as a repository for startup software which is installed in the factory and may not be altered. The startup software in ROM 240 is executed automatically by CPU 210 when power is applied to the system. This allows the system to initialize itself securely. Additional details of the startup software will be provided with respect to FIG. 4 below.

A device select decoder 244 operates to decode certain address ranges and provides signals to select certain external devices. Though not a necessary element of the present invention, device select decoder 244 reduces the amount of logic needed on external devices to decode addresses and to add flexibility to external devices. In the specific embodiment, device select lines are used to enable individual cryptographic coprocessors 115.

In the specific embodiment, secure bus 120 (FIG. 1) is connected to a secure memory management unit (MMU) forming a part of the CPU 210. Of course, if another device is used as CPU 210 that does not have a secure MMU, additional circuitry outside CPU 210 may be used to provide secure bus 120. However, the MMU of CPU 210 operates to effectively shield the internal data bus 215 from external probing, thereby securing internal information of the cryptographic processor 110 from surreptitious inquiry. The cryptographic processor 110 connects to secure bus 120 by a secure bus interface 246. Secure bus interface 246 provides the driver and receiver circuits for the signal lines that make up the secure bus 120.

Before being placed on secure bus 120, data is first encrypted to make it secure by the DES bus encryption engine 250, using Data Encryption Standard, an American National Standards Institute (ANSI) approved standard for data encryption (ANSI X3.92). The DES engine 250 is configured to operate at 20 Mbytes per second and will operate in either ECB or CBC modes. Details of the DES protocol are well known in the art of cryptography and may be found, for example, in U.S. National Bureau of Standard, "Data Encryption Standard," Federal Processing Standard (FIPS) Publication 46, January 1977. However, the present invention is not limited to DES protocol for secure bus 120. Other encryption algorithms, now known or yet to be developed, may also be used to make secure bus 120 secure.

The keys for the DES encryption performed by the DES engine 250 are generated randomly and stored by CPU 210. As such, no human need ever know the DES keys. In the specific embodiment, these keys are stored in real time clock (RTC RAM) 255 that has a small amount of RAM provided. RTC RAM 255 has an external battery 257. This protects the contents of RTC RAM 255 when power is removed from the system.

The RSA engine 260 is a special purpose arithmetic unit designed and structured to perform fast modular exponentiation. In the specific embodiment, it performs 10 exponentiations per second on a 1024 bit value. Its design and operation will be understood by one of skill in the art. If another encryption method besides RSA public key cryptography is provided by the system, other types of arithmetic units may be provided along with or instead of RSA engine 260.

In operation, the cryptographic system 100 (FIG. 1) will receive an encryption request or a decryption request from the host (not shown) via messages that connects the system to the host. The encryption request will include the message data to be encrypted and, perhaps, the encryption keys. Alternatively, the encryption keys may be kept in RAM 126 (FIG. 1) or RAM 230 (FIG. 2) of the cryptographic processor 110. The decryption request will include the cyphertext and the decryption keys. The request and any accompanying keys, are passed to cryptographic processor 110 of one of the processing boards 107 by the host interface 105.

For public key RSA, the CPU 210 of the cryptographic processor 110 receiving the request will construct exponentiation tasks for execution by RSA engine 260 from the message data and the keys. RSA engine 260 performs exponentiations and returns the results to CPU 210. As described above, the encryption and decryption may be broken into one or more exponentiation tasks. These tasks can be performed in parallel to speed up the operation. The individual results of the exponentiation tasks are combined using the principles of the Chinese Remainder Theorem by CPU 210 to form the result—as described in the aforementioned patent application Ser. No. 08/085,993, which was previously incorporated by reference.

To speed up performance of the exponentiation tasks, the work may be offloaded on secure bus 120 to cryptographic coprocessor 115. Typically, cryptographic coprocessor 115 is a specialized processor capable of performing multiple exponentiations or other cryptographic calculations at a greater rate. More details regarding cryptographic coprocessor 115 will be given with respect to FIG. 3 below.

The hashing engine 270 is provided as part of the cryptographic processor 110 to calculate an expected hash value for a message provided to it. The expected hash value is generally a checksum value used to verify that the message has not been altered. If the expected hash value matches a hash value that was generated earlier and appended to the message, then a degree of confidence is gained in the validity of the message. The amount of confidence is based upon the hash algorithm used. In the specific embodiment, hash engine 270 performs a FIPS 180-1 compliant Secure Hash Algorithm (SHA-1.) SHA-1 produces a 160-bit hash value.

Hash values are appended to messages sent over secure bus 120. If the message changes en route, the hash value that is attached to the data will not match the expected hash value that is computed for the message at the other end.

Physical security circuits 280 are also incorporated in cryptographic processor 110 to monitor the battery level and the VCC level. The physical security circuits operate to detect voltage levels which tend to indicate that the chip is possibly being tampered with and provide an alarm to CPU 210. Included in physical security circuits is a non-volatile VROM 282. VROM 282 is a memory that is physically secure, and one-time programmable. It is programmed with a seed for generating DES keys, the public key of an RSA public/private key pair, and an ICF flag. The uses of these components will be explained below with respect to FIG. 4

Figure 3:
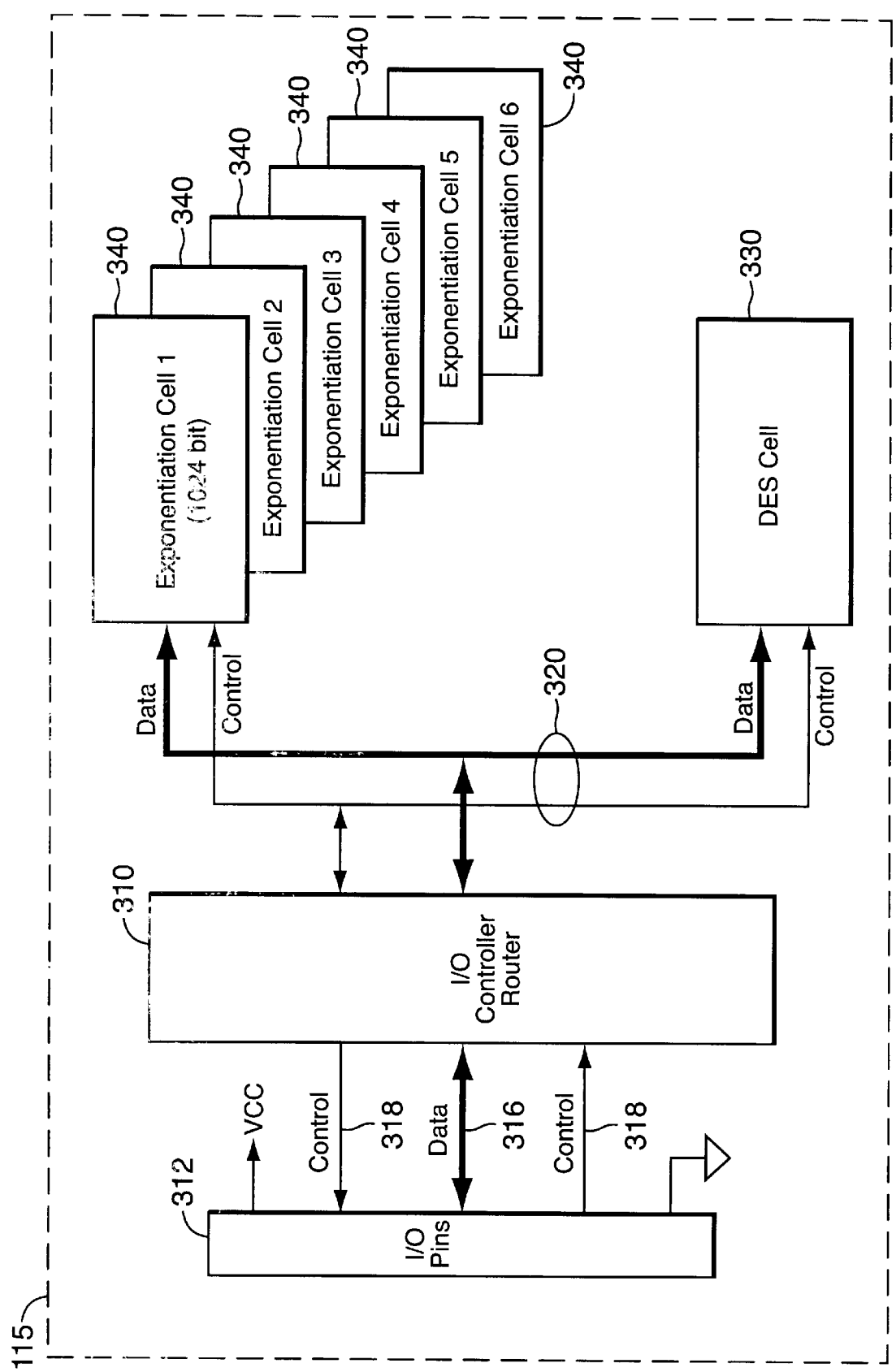
FIG. 3 illustrates, in block diagram form, the cryptographic coprocessor.

FIG. 3 depicts a more detailed block diagram of cryptographic coprocessor 115. Data is communicated between cryptographic coprocessor 115 and secure bus 120 through I/O pins 312 which connect to an I/O controller router 310 by a data bus 316 and a control bus 318. As described herein, cryptographic co-processors 115 are each on a separate VLSI components. However, if it resided on the same component as cryptographic processor 110, I/O pins 312 would not be necessary. In the specific embodiment, data bus 316 is a 32-bits wide data bus. One of the signals on control bus 318 may be a device select signal. The device select signal is decoded from an address range that is assigned to a particular cryptographic coprocessor 115. This may be any range addressable by the addressing bandwidth of CPU 210. As mentioned above, cryptographic processor 110 may include device select decoder 244 (FIG. 2) for providing the device select signal. When an address in the defined range is referenced, the device select signal is asserted for the particular cryptographic coprocessor 115.

As FIG. 3 further shows, the I/O controller router 310 of the cryptographic co-processor 115 is coupled by a data/control bus 320 to a DES cell 330 and a number of exponentiation cells 340. The DES cell 330 operates as a companion to the DES engine 250 of the cryptographic processor 110 (FIG. 2). In fact, it is designed in much the same way as the DES engine 250 to decrypt data received from the secure bus 120, and to encrypt data to be communicated to the cryptographic processor 110. The exponentiation cells 340 are substantially identical to one another, and are special purpose arithmetic units designed and structured to do fast exponentiation. In the specific embodiment, cryptographic co-processor 115 includes six exponentiation cells 340, although this number may be greater or fewer depending on the needs of the user and the capabilities of the technology. The specific embodiment of cryptographic processor 110 allows the attachment of up to eight cryptographic co-processors 115 to a single cryptographic processor 110.

In operation, a cryptographic coprocessor 115 receives tasks from the cryptographic processor 110 (i.e., the CPU 210) and returns results of such tasks. Data received by I/O controller router 310 is generally encrypted. If so, it is sent to the DES cell 330 for decryption before being routed to an available exponentiation cell 340. The exponentiation cell performs the exponentiation, and the results are encrypted by DES cell 330 and sent back to cryptographic processor 110. Typically, the exponentiation calculations will take much more time than the DES encryption/decryption. Therefore, having only one engine encryption/decryption (i.e., DES cell 330) does not generally cause a bottleneck to the throughput. However, if needed, multiple DES cells 330 may be provided.

Figure 4:
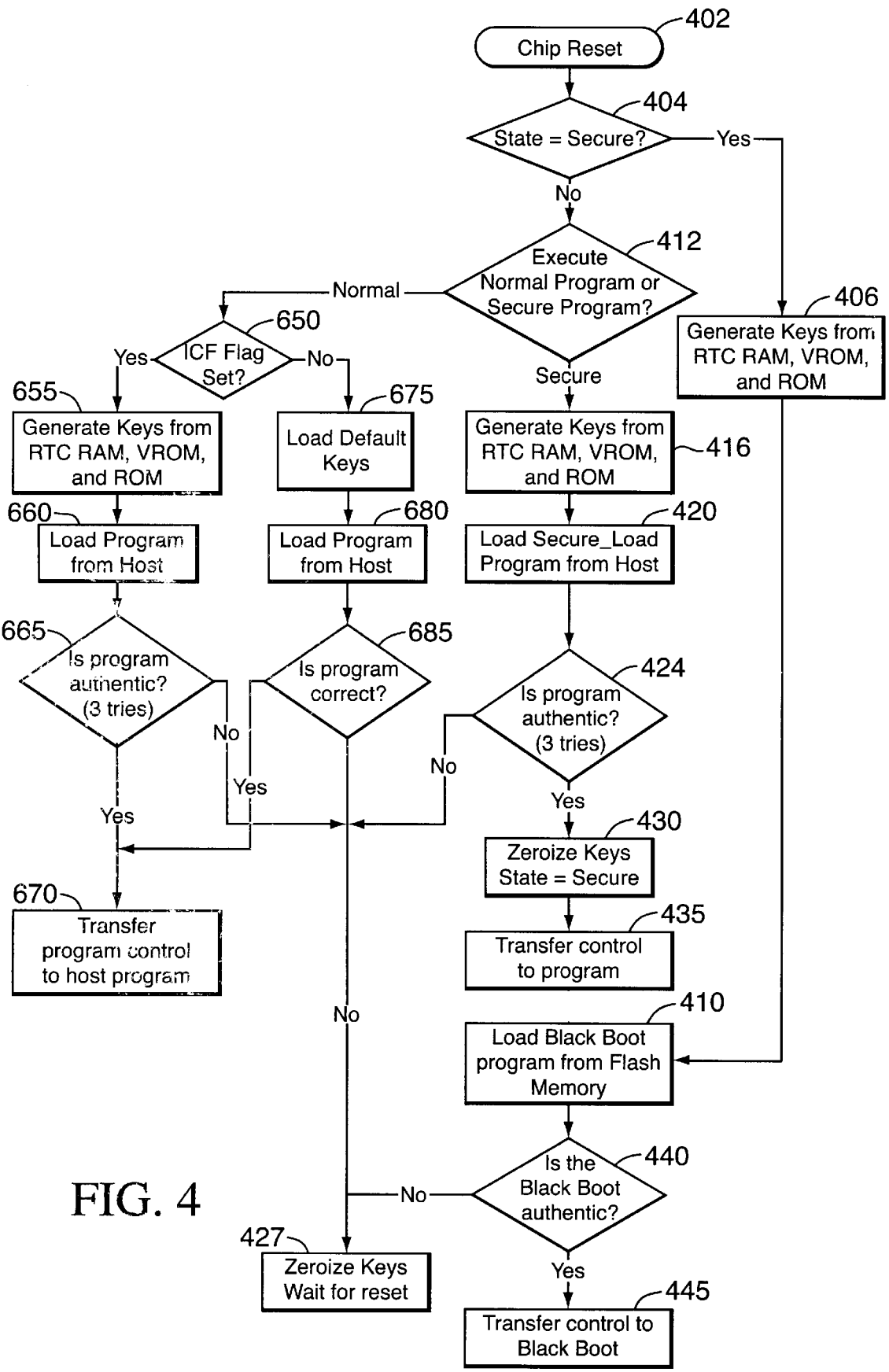
FIG. 4 is a flow diagram of a secure startup program used to initialize the cryptographic system of FIG. 1.

FIG. 4 illustrates, in flowchart form, the initialization procedure 400 used to start up cryptographic system 100 upon reset, and to possibly place the cryptographic system 100 in a secure state. Typically, the method is implemented as a series of software instructions that reside in a system memory, i.e., ROM 240 (FIG. 2). Whatever memory is used to contain the process that implements the initialization method shown in FIG. 4 should be a secure memory so that it cannot be altered after its manufacture. ROM 240 is an example of such a secure memory. At the time of manufacture, software instructions are hardwired into ROM 240. The contents may not be externally probed or altered without destruction, nor can the ROM 240 be read by external (to the cryptographic processor 110) sources. The MMU of the CPU 210 operates to isolate and shield the data bus 215, and thereby the content of ROM 240, from surreptitious access.

The software operates on a processor such as CPU 210. CPU 210 is constructed or otherwise configured so that the software in ROM 240 is automatically executed after a system reset before any other software. A purpose of this feature is to place the system in a secure state, and perhaps to load a proper application program. This ensures that the user knows which program is executing, and that the system is properly secured before any sensitive data is allowed to be brought into the system.

Referring to FIG. 4, at step 402 a chip reset occurs because of system power-up or other system reset. In this step, CPU 210 performs a self-test on the system and initializes all of the volatile registers to known values.

After initialization is completed, in step 404, CPU 210 examines its registers to determine if it is in a secure state or an unsecure state. Initially, the system will be in an unsecure state. Only a system that was previously in a secure state before powering down or being reset will be initiated to the secure state upon chip reset.

If in step 404, CPU 210 determines that it is in a secure state, in step 406 it generates its DES keys from seed values found in RTC RAM 255, VROM 282, and ROM 240. These keys are stored in volatile RAM, so they must be regenerated each time the system is initialized. After generating the keys, CPU 210 proceeds to step 410 in which it loads a black boot program from flash memory. The details of step 410 will be given more completely below.

If CPU 210 finds that it is not in a secure state, it proceeds to step 412 in which it waits for a command from the host (not shown.) Some time later, since CPU does not have a program to execute, the host issues a command to load a program. CPU examines the command, and it determines whether the command is to load a secure program or a normal (i.e., non-secure) program. The process for executing non-secure programs is illustrated below with respect to steps 650–685.

In order to execute a secure program, the system must be put into the secure state. In step 416, the cryptographic keys are generated from RTC RAM 255, VROM 284, and the ROM 240 as in step 406. Then, in step 420, the host loads a program file 510 (FIG. 5) to the cryptographic system 100. In step 420, program file 510 is a Secure_Load program designed to securely load a program from the flash memory 124. The program file is encrypted inside an encrypted program packet 500 (FIG. 5) because it comes from the host outside the secure portion of the cryptographic processor 110. The encrypted program packet 500, in addition to being encrypted, preferably includes other protection to ensure its authenticity.

In step 424, the encrypted program packet is decrypted and verified for authenticity. In the specific embodiment, the decryption is accomplished by DES engine 250. The decrypted result, a program packet that includes the program file and additional header and trailer information, is preferably subjected to further checks before loading the Secure_ program into the CPU memory. These checks are done using the header and trailer information, to gain a level of confidence that the program is the one that is intended to be run.

Figure 5:
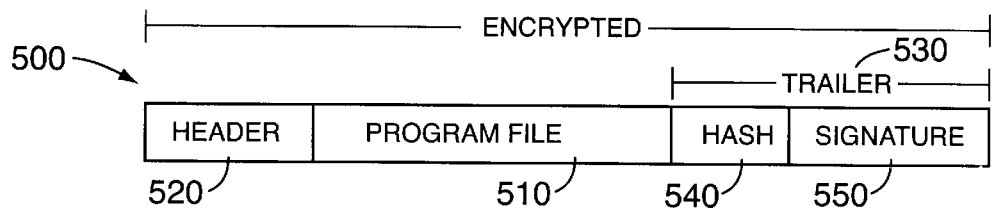
FIG. 5 shows a possible structure of a cyphertext program packet.

Digressing for the moment, FIG. 5 depicts an example of a format for the encrypted program packet. Preferably, the encrypted form of the program packet is triple-DES encoded using CBC mode. As FIG. 5 shows, the encrypted program packet 500 contains a program file 510 (for execution by CPU 210) preceded by a header 520 and followed by a trailer 530. The header 520 contains information about the program packet 500 such as the length of the program file and its starting address. The trailer 530 contains additional security information such as a hash value 540 and a digital signature 550.

Returning to step 424 of FIG. 4, after the program packet 500 is decrypted by the DES engine 250, it is then examined to determine that the decrypted program file has a valid program length and starting address as specified by the (also decrypted) information of the header 520. Finding that the format is correct provides a level of confidence that the decryption was properly performed, and/or that the decrypted program file was that retrieved from the host, i.e., that there has not been clandestine attempt to introduce a fraudulent program file that could operate to extract confidential information from the cryptographic processor 110.

If the program packet format is not what is expected, the system will exit step 424 in favor of an abort mode at step 427. Here, to protect itself from unwanted intrusion, the cryptographic system 100 will erase all cryptographic keys (i.e., the keys in RTC RAM 255) in step 427, and the cryptographic system 100 is then placed in a non-functioning state. It remains in this state, until the cryptographic system 100 is reset. Since the initialization aprogram did not complete, nothing about the system can be assumed to be secure, so secret data should not be allowed.

If the packet format is determined to be correct, however, hash value 540, a checksum developed from the original (plaintext) form of the program file 510 is checked against that developed by the hash engine 270 after decryption. If a hash of the program file matches hash value 540, then a level of confidence that the program file has not changed may be inferred.

If, however, the hash values do not match, the initialization is aborted by exiting to step 427 to erase the cryptographic keys, as described above. Cryptographic processor 110 is then moved into the non-functioning state.

A match of hash values moves the initialization procedure to its final check where is checks digital signature 550. Digital signature 550 is created by encrypting the hash value with a private key of an RSA public/private pair. The hash value 540 developed from the program file before encryption and stored in flash memory 124 is itself encrypted by the RSA scheme, using the private key of the pair, before being added to the trailer 530 of the program packet as the signature 550. The VROM 282 is programmed with the public key of the pair when the cryptographic system is manufactured. When the program packet is decrypted, and a hash value produced from the decrypted version of the program file 510, the accompanying signature 550 is then decrypted using the public key retrieved from the VROM 282, and the decrypted result compared to the created hash value. A match furnishes an added confidence that the program packet 500, and in particular the program file 510 it contains, was indeed generated from a source that was intended.

If, however, the digital signature is incorrect, i.e., the hash value created by the hash engine 270 does not match that resulting from the RSA decryption of the signature 550, the initialization is aborted to the key erasure step of step 427, and the cryptographic system 100 placed in the non-functioning state 462.

Recognizing that spurious errors may occur during transmission or checking of the encrypted program packet 500, rather than aborting to the non-functioning state immediately upon detection of a anomaly in the checking scheme, in the specific embodiment, CPU 210 makes three attempts to authenticate the program before aborting to step 427.

If the checks performed at step 424 show that the encrypted program file 510 is authentic, the Secure_Load file 510 is assumed to be correct, and is then written to the RAM 230. In step 430, the keys are zeroized and the state is set to the secure state. Then in step 435, control of the CPU 210 (and thereby the cryptographic system 100) is transferred to now RAM-based Secure_Load program 510.

Although the Secure_Load program may be changed from time to time, this method provides a level of confidence that the program file 510 has not been altered or replaced by a fraudulent program. This allows a great amount of flexibility, while still providing security. Furthermore, maintenance updates and program enhancements may be made by simply changing the program that is downloaded from the host. If it is properly signed, any program may be loaded. Also, since the program is signed by the private key, but may be verified by the public key, the private key does not need to be stored anywhere on the system.

After control of CPU 210 is transferred to the program file, which in this step is the Secure_Load program, step 410 (already mentioned above) loads a secondary loader program referred to as a black boot program from the Flash Memory 124.

Digressing for the moment, the black boot program is a program that may be customized for each user, by allowing the user to put personalized RSA keys and set other options in a key/option table, these keys being unknown to anyone else. The manufacturer or other provider of the cryptographic system creates the black boot program, including an empty key/option table. This black boot program is provided to the end-user in object form (without header, hash, signature, hash of the key/option table, and the key/option table itself). The end-user generates the key/option table and delivers a hash of the table to the manufacturer. The manufacturer concatenates the hash to the black boot image, hashes and signs the resulting image with the private key corresponding to the public key stored in the VROM 282. The signature (combined with the header, hash, signature, hash of the key/option table, and the key option table itself) is returned to the end-user. The black boot program is downloaded into the flash memory 124 of cryptographic system 100 from the host in encrypted form, in the format shown in FIG. 5.

The black boot program's main function is to load other user-application programs into flash memory 124, or to start an application from flash memory 124 (if it is already there). These user-application programs may be anything the user wants to run, and are encrypted using the format shown in FIG. 5 and signed using the private RSA key corresponding to a public RSA key in the key/option table. Since the RSA key is unknown to anyone other than the user, including the manufacturer of the cryptographic system, the user can run any program and ensure privacy.

Referring again to FIG. 4, in step 440, CPU 210 determines if the black boot is authentic using the same technique described above in step 424. If it is not authentic, then operation is aborted to step 427 and the keys are zeroized and the cryptographic system 100 is placed in a non-functioning state awaiting a reset. If it is authentic, then the black boot program is loaded into RAM, and control of CPU 210 is transferred to the black boot program.

Figure 6:
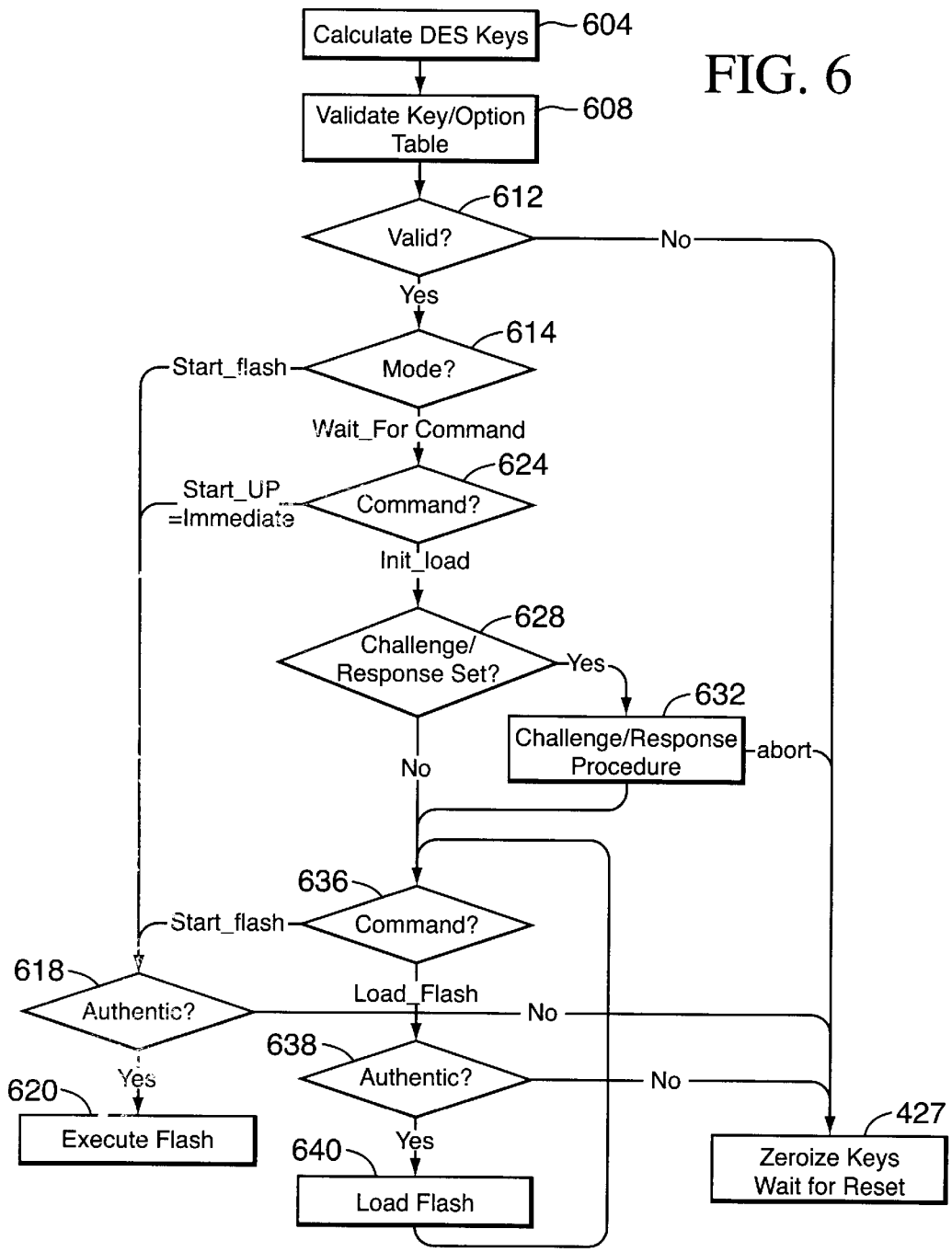
FIG. 6 is a flow diagram of a secondary loader program that may be used to load user applications.

FIG. 6, illustrates in flow diagram format, an exemplary black boot program 600. In step 604, black boot program 600 calculates new DES keys from RTC RAM 255, VROM 282, and ROM 240, since these were zeroized during step 430. Using these DES keys, data may be transferred over the secure bus 120. User applications, when stored in flash memory 124 are DES encrypted according to the format shown in FIG. 5.

In step 608, black boot program validates the key/option table. In step 612, if the key/option table is valid, then the execution continues with step 614. If not, then the execution is aborted to step 427, the keys are zeroized and the cryptographic system 100 enters a non-functioning state, waiting for a chip reset.

In step 614, a decision is made on what mode the cryptographic system is operating in. The black boot program 600 has two modes, start_up_immediate and wait_for_command. If the system is in start_up_immediate mode, then at this point the black boot program 600 branches to step 618. In step 618, the program in flash memory 124 is authenticated using the procedure described for step 424. If it fails three times, then the keys are erased and the cryptographic system 100 is place in non-functioning mode. If it passes the authentication step 618, then control of CPU 210 is transferred to the user application program.

If the system is in wait_for_command mode, then the black boot program 500 branches to step 624 and it stays in that step until a command is issued. The commands that may be issued are init_load (initialize the system to load a program into flash memory 124), start_flash (execute the program in flash memory 124), and load_flash (load the program into flash memory 124). If the command is start_flash, then the black boot program 500 branches to step 618 and 620 to authenticate and execute the program in flash memory 124 as described above. Otherwise, an init_load command is issued.

Upon receipt of the init_load command, the black boot program 500 checks the key/option table for the value of a challenge/response bit in step 628. If it is set, then a challenge response procedure is executed in step 632. The challenge/response procedure involves host communication to determine that the host is authorized to load the application into flash. The black boot program 600 generates a random number known as ChallengeID. ChallengeID is hashed and sent to the host, which attaches its own hashed random number and digitally signs them both using a private key, corresponding to a public key in the key/options table. These are sent back to the CPU 210, which decrypts them with the private key.

If the challenge response procedure fails, the black boot program 500 is aborted to step 427, the keys are zeroized and the cryptographic system is placed in a non-functioning state. Otherwise, the black boot program 500 branches to step 636, where it waits for a command. If the command is a load_flash command, then the program is authenticated in step 638. If it fails, the program aborts to step 427, and if it succeeds then the user-application program is stored in the DES encrypted format of FIG. 5 in flash memory 124. If it is a start_flash command, then the program in flash is executed, after authentication.

The following is pseudocode that is appropriate for use as black boot program 500.

```
bb_start:
Send "abb_initializing" status to the host
calculate the DES_KEY from seeds
validate KOT_hash
if KOT_hash is invalid
    /*This a fatal error*/
    clear all RTC RAM
    Send "abb_kot_hash_failed" status to the host
    wait for reset
END /*KOT hash not verified*/
IF START_UP is set to start Flash image
    /*We drop here if START_UP option is set to immediate mode*/
    start_flash( ) /*There will be not return*/
    /*The START_UP option is set to command mode*/
    IF WAIT_FOR_COMMAND suboption is set
        main_loop:
            wait_for_command( ):
            IF received START_FLASH command
            /*The host has to feed the correct sequence of
            INIT_LOAD, LOAD_FLASHs or rely on the image to be in
Flash */
                Send "abb_starting_flash"
                start_from_flash( )
```

-continued

```
            END
        IF received INIT LOAD command
            IF CHALLANGE_RESPONSE is not set
            reset errcode
            else errcode = challenge_response( )
            IF (errcode)
              clear application area in RTC RAM
              goto main_loop
            END
            /*The application is authorized to load Flash*/
            Send "abb_proceed_load" to the host
            DO FOREVER
              wait_for_command( )
              /*The host is responsible to issue START-FLASH and
              LOAD_FLASH*/
              /*in correct order*/
              IF received START_FLASH
                start_flash( )
              IF received LOAD_FLASH
                /*All addresses, sizes and other parameters are in the
                mailbox/* load_block( )
            END /*DO FOREVER*/
      END
END
      /*The command was not recognized (it was none of
START_FLASH, INIT_LOAD*/ goto main_loop
END
/*We drop here is START-UP option isn't set*/
start_flash( )    /*There will be no return */
procedure start_flash:
            check hash and signature
            IF any of these didn't check up to 3 times
                erase application area in RTC RAM
                send "abb_eflash" status to the host
                goto main_loop
            END
            extract entry_point out of the application header
            IF APPLICATION_NAME option did not pass validation
                Send "abb_ename" to host
                erase application area in RTC RAM
                goto main_loop
            END
            /*Here we actually start the secure application*/
            transfer control to the entry point
END start_flash
procedure load_flash
        Send "abb_loading" to the host
        read and validate load parameters, translate addresses if
        needed
        unenvelope the RAM block using ENVELOPING option
        encrypt the data with the precomputed DEC key
        transfer the encrypted block to Flash
Challenge/Response procedure Message  =   (RandFill || ChallengeID)
        Hash     =   SHA1(Message)
        Signature =  RSApriv(Hash)
        Response =   Message || Signature
compute ChallengeID
send ChallengeID (challenge) to the host
receive the response and verify all fields
IF error
      return E_MSG
IF response.ChallengeID !=ChallengeID
      return E_ID
calculate hash of (RandFill || ChallengeID) from response
verify signature of the hash
IF verification_error
      return E_SGN
ELSE
      return E_OK
```

It can easily be envisioned that using the principles of this invention, application programs may be distributed in a variety of ways and maintain a level of security. For example, files may be sent over networks, such as the Internet, where there is great opportunity for mischief, but the sender and receiver can have a great deal of confidence that the program that ends up running on the system has not been altered or replaced. Furthermore, a seller of software for secure systems may ensure that all systems running its software are authorized users.

Referring again to step 412, if the program to be executed is a normal program, then in step 450, CPU 210 examines an ICF flag in the VROM 282. The ICF flag is set at the manufacturer, and is put in place to meet certain governmental regulations about exporting cryptographic systems. If the ICF flag is set, then no program is allowed to run that is not digitally signed, even in normal mode. This prevents unauthorized programs from running, as the U.S. Government will not allow export of certain cryptographic techniques If the ICF flag is not set, then any program may be run, even if it is not digitally signed, in normal mode.

If the ICF flag is set, then the program must be authenticated just as it is in the secure mode. Steps 655–665 are similar to steps 416 through 424 described above. However, the program file may be any program that has been properly authenticated. If it is authenticated, then in step 470, control of CPU 210 is transferred to the program. If it is not authenticated, then the keys are zeroized and the cryptographic system enters a non-functional state in step 427.

If the ICF flag is not set, then the system simply loads default keys in step 475 and loads a program from the host in step 480. The program is checked to ensure that it is correct, but no digital signature is provided. If it is correct, then it is executed in step 470, and if not then the program aborts to step 427 as described above.

Although specific embodiments of the present invention have been included herein, these are given by way of example only. The invention is not limited, except by the attached claims. One of skill in the art can readily envision variations and alternatives to the cited examples that do not depart from the spirit of the present invention. Such variations and alternatives are anticipated by this invention.

What is claimed is:

1. A cryptographic system comprising:
    a bus interface for transferring data between the cryptographic system and an external source;
    a processor, the processor receiving data from the bus interface, and constructing from the data a plurality of exponentiation tasks;
    a plurality of exponentiation units, the processor transferring each of the plurality of exponentiation tasks to a corresponding one of the plurality of exponentiation units so that the plurality of exponentiation tasks can be performed substantially in parallel by the plurality of exponentiation units in order to speed up system operations, and the plurality of exponentiation units returning results of the plurality of exponentiation tasks to the processor; and
    initialization means operatively coupled to the processor and configured to place the cryptographic system in a secure state after system reset and allow execution of a secure program, but prior to each execution the secure program is verified and authenticated via the processor.

2. The cryptographic system of claim 1 wherein at least one of the plurality of exponentiation units is on a first integrated circuit and the processor is on a second integrated circuit.

3. The cryptographic system of claim 2, further comprising:
    a first encryption engine on the first integrated circuit;
    a second encryption engine on the second integrated circuit;
    a secure bus, whereby when data is transferred from the first integrated circuit to the second integrated circuit, it is encrypted by the first encryption engine.

4. The cryptographic system of claim 3 wherein the second encryption engine decrypts the data.

5. A method of initializing a cryptographic system, comprising:
    decrypting by the cryptographic system an encrypted packet with a load program to create an original load program;
    authenticating and validating the original load program; and
    if the original load program is determined to be a secure load file and is authenticated, placing the cryptographic system in a secure mode, and
        authenticating a secondary loader program, wherein the secondary loader program can be customized for a user by placing a personalized key in a table, and wherein the secondary loader program is configured,
            in response to a load command from the cryptographic system, to allow a user program to be loaded and stored in memory if the user program is authenticated, the user program being signed by a private key corresponding to the personalized key that is known only to the user, and
            in response to a start command from the cryptographic system, to execute the stored user program if it is authenticated;
    each time the cryptographic system is initialized upon power up, if the system is initialized in a secure mode, generating cryptographic keys, including the first decryption key, from seed values held securely in the cryptographic system.

6. A method as in claim 5 further comprising:
    if the original load program is determined to be a normal load file and is authenticated, determining the state of an exporting regulation flag, so that
    if the exporting regulation flag is set authenticating a program before allowing it to execute, and
    if the exporting regulation flag is reset allowing the program to execute in normal mode.

* * * * *

UNITED STATES PATENT AND TRADEMARK OFFICE
CERTIFICATE OF CORRECTION

PATENT NO. : 6,378,072 B1
DATED : April 23, 2002
INVENTOR(S) : Thomas Collins et al.

It is certified that error appears in the above-identified patent and that said Letters Patent is hereby corrected as shown below:

Column 2,
Line 22, insert:
-- The Chinese Remainder Theorem allows the necessary computations to be divided into two exponentiations. Commonly assigned U.S. Patent 5,848,159 filed January 16, 1997, which is incorporated by reference for all purposes, discloses a method of using multiple prime numbers to create the composite number and further dividing the exponentiations into multiple smaller exponentiations. However, though the encrypting and decrypting exponentiations are smaller and therefore more quickly accomplished, the factorization of the composite number is no easier to compute. So, the security of the system is not comprised. --

Column 6,
Line 38, reads:
"the host (not shown) via messages that connects the system"
it should read:
-- the host (not shown) via messages that connect the system --
Line 59, reads:
"tioned patent application Ser. No. 08/085,993, which was"
it should read:
-- tioned patent application Ser. No. 08/784,453, which was --

Column 9,
Line 51, reads:
"graphic system 100 is reset. Since the initialization apro-"
it should read:
-- graphic system 100 is reset. Since the initialization pro- --
Line 66, reads:
"to its final check where is checks digital signature 550."
it should read:
-- to its final check where it checks digital signature 550. --

Column 10,
Line 21 reads:
"and the cryptographic system 100 placed in the non-"
it should read:
-- and the cryptographic system 100 is place in the non- --

UNITED STATES PATENT AND TRADEMARK OFFICE
CERTIFICATE OF CORRECTION

PATENT NO.    : 6,378,072 B1
DATED         : April 23, 2002
INVENTOR(S)   : Thomas Collins et al.

It is certified that error appears in the above-identified patent and that said Letters Patent is hereby corrected as shown below:

<u>Column 10 cont'd,</u>
Line 22, reads:
"functioning state 462."
it should read:
-- functioning state 402. --
Line 26, reads:
"ately upon detection of a anomaly in the checking scheme,"
it should read:
-- ately upon detection of an anomaly in the checking scheme, --.

<u>Column 12,</u>
Line 3 reads:
"and the cryptographic system 100 is place in non-"
it should read:
-- and the cryptographic system 100 is placed in non- --

<u>Column 15,</u>
Line 2, reads:
"is a normal program, then in step 450, CPU 210 examines an"
it should read:
-- is a normal program, then in step 650, CPU 210 examines an --
Line 16, reads:
"authenticated. If it is authenticated, then in step 470, control"
it should read:
-- authenticated. If it is authenticated, then in step 670, control --;
Line 21, reads:
"default keys in step 475 and loads a program from the host"
it should read:
-- default keys in step 675 and loads a program from the host --;
Line 22, reads:
"in step 480. The program is checked to ensure that it is"
it should read:
-- in step 680. The program is checked to ensure that it is --;

UNITED STATES PATENT AND TRADEMARK OFFICE
CERTIFICATE OF CORRECTION

PATENT NO.    : 6,378,072 B1
DATED         : April 23, 2002
INVENTOR(S)   : Thomas Collins et al.

It is certified that error appears in the above-identified patent and that said Letters Patent is hereby corrected as shown below:

<u>Column 15 cont'd,</u>
Line 24, reads:
"then it is executed in step 470, and if not then the program"
it should read:
-- then it is executed in step 670, and if not then the program --.

Signed and Sealed this

Twenty-sixth Day of November, 2002

Attest:

Attesting Officer

JAMES E. ROGAN
*Director of the United States Patent and Trademark Office*